3,322,520
GASOLINE INHIBITOR
Marshall R. Brimer and Howard C. McCulley, Kingsport, Tenn., assignors to Eastman Kodak Company, Rochester, N.Y., a corporation of New Jersey
No Drawing. Filed Mar. 23, 1964, Ser. No. 354,137
2 Claims. (Cl. 44—74)

This invention relates to a new chemical compound which is useful for inhibiting gum formation in motor fuels, and to stabilized gasoline compositions containing the compound.

It is well known that hydrocarbon motor fuels, particularly those manufactured by catalytic processes such as cracking and polymerization, tend during storage to form insoluble gummy decomposition products. These are known to form resin-like deposits in the carburetor and intake manifold and on the valve stems of internal combustion engines in which the gasoline containing them is used. As these decomposition products form, the gasoline also tends to deteriorate in color and in antiknock value.

The cause of gum formation in such cracked gasolines is not entirely known. However, it is believed to be caused by auto-oxidation, polymerization and condensation of highly reactive constituents such as unsaturated hydrocarbons present in the gasoline mixture. As these unsaturated compounds are destroyed the antiknock rating of the gasoline decreases. Straight-run gasolines do not ordinarily have the same undesirable tendency to deteriorate as do cracked gasolines, although blended stocks containing a mixture of cracked gasoline and straight-run gasoline usually are subject to this tendency.

The constituents which cause gum formation may be removed by severe treatment of the gasoline with chemicals such as sulfuric acid. Such treatment results in the loss of valuable antiknock constituents of the gasoline and is generally avoided as much as possible.

When saturated gasoline is treated with lead compounds as is common in the preparation of aviation fuels, the composition frequently deposits an insoluble residue on storage. This residue is known to be due primarily to the decomposition of tetraalkyl lead compound. This decomposition is very undesirable since the octane number of the fuel is reduced thereby and the insoluble material fouls the fuel intake system of the engine in which such fuel is used.

It is also know that deterioration of hydrocarbon motor fuels can be retarded to a greater or lesser degree by incorporation in the fuel of certain organic phenolic and amino compounds. Compounds which presently enjoy wide commercial use for this purpose are 2,4,6-trialkyl-phenols, N-alkyl-p-aminophenols and N-N'-di(sec-alkyl)-p-phenylenediamines. The trialkylphenols are relatively poor gum inhibitors but are generally effective stabilizers for tetraethyl lead in aviation fuels. The n-alkyl-p-aminophenols, such as N-(n-butyl)-p-aminophenol and N-iso-butyl-p-aminophenol are effective, both for inhibiting gum formation and also for stabilizing lead in gasoline.

Of the p-phenylenediamine derivatives, N-N'-di(sec-butyl)-p-phenylenediamine is used extensively as a gum inhibitor in cracked hydrocarbons and as a lead stabilizer in aviation fuels. Although this compound is a highly useful inhibitor, it is subject to the disadvantage that it develops decomposition products having a red color and high tinctorial properties. This characteristic is objectionable especially when the material is used in aviation fuels which are colored with soluble dyes to designate the various grades or octane ranges of the fuel. For example, oxidation of this inhibitor in samples of blue gasoline has been known to produce a purple colored gasoline with subsequent misidentification of the fuel.

Another class of phenylenediamine derivatives useful as a gum inhibitor in gasolines are the N-(sec-alkyl)-N'-phenyl-p-phenylenediamines exemplified by N-(sec-butyl)-N'-phenyl-p-phenylenediamine and N-isopropyl-N'phenyl-p-phenylenediamine disclosed in U.S. Patent 2,734,808.

This invention has an an object to provide a new organic compound which is highly effective for inhibiting the formation of gum in gasoline.

A further object is to provide a new organic compound which is effective as a gum inhibitor but does not decompose to give compounds which impart an undesirable color to the gasoline to which it is added.

A still further object is to provide improved gasoline compositions stabilized against gum formation.

Other objects will appear hereinafter.

These objects are accomplished by the following invention which is based upon the discovery that N-xylyl-N'-isopropyl-p-phenylenediamine is an excellent gum inhibitor or stabilizer for gasoline. This compound has the structural formula

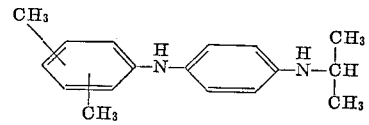

The amount of inhibtor or stabilizer to be added to a given gasoline is dependent on the particular hydrocarbon fuel treated, the amount of pro-oxidant metal present and the stability requirements of the treated composition. Usually only small amounts of the inhibitor are necessary to effect the desired degree of stabilization. In accordance with the invention the amount of inhibitor may be added to both leaded and unleaded gasoline in an amount within the range of .0001 to .01 percent and preferably within the range of .001 to .005 percent of the total composition. The most advantageous concentration for a particular gasoline composition can be readily determined by the tests and observations customarily employed in the art. Other materials such as dyes, antiknock agents, metal deactivators, and the like may be employed in conjunction with the inhibitor of our invention. Incorporation of the inhibitor may be in accordance with procedures well known in the art, as for example, by first dissolving the inhibitor, to the desired concentration, in a gasoline stock to provide a mix or concentrate and then adding this mix to the gasoline to be treated in such amounts as to give the desired stabilizing effect.

In the following examples and description we have set forth several of the preferred embodiments of our invention but they are included merely for purposes of illustration and not as a limitation thereof.

PREPARATION OF INHIBITOR

N-xylyl-N'-isopropyl-p-phenylenediamine may be prepared by the reductive alkylation of N-(p-nitrophenyl)-xylidine in accordance with the following equations:

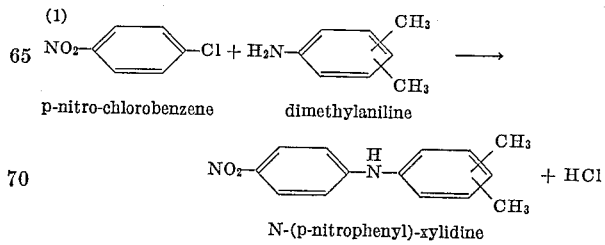

p-nitro-chlorobenzene     dimethylaniline

N-(p-nitrophenyl)-xylidine (2) 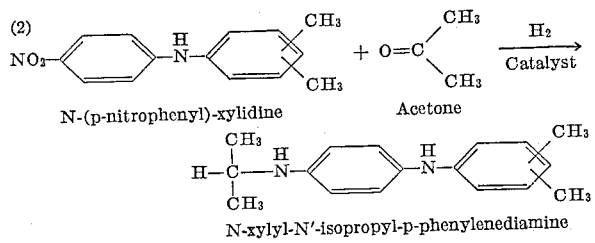

N-(p-nitrophenyl)-xylidine   Acetone

N-xylyl-N'-isopropyl-p-phenylenediamine

This compound may also be prepared by the reductive alkylation of the corresponding amino or nitroso derivatives. Alternatively, a N-alkyl-p-aminophenol may be condensed with a xylidine in acordance with the following equation:

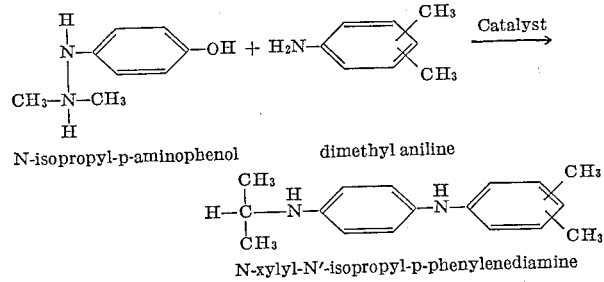

N-isopropyl-p-aminophenol   dimethyl aniline

N-xylyl-N'-isopropyl-p-phenylenediamine

*Preparation procedure (Equation 2 above).*—79.0 grams (0.37 mol) N(p-aminophenyl) xylidine, 240.0 grams (4.14 mols) dimethyl ketone and 10.0 grams copper chromite were charged to a pressure vessel equipped with an efficient agitator. The vessel was closed and purged twice with hydrogen. The hydrogen pressure was built up to 100 p.s.i. and the temperature was raised to 165–170° C. These conditions were maintained for one hour, at the end of which time the the reduction was essentially complete. The autoclave was cooled to room temperature and the batch removed and filtered to remove the catalyst. The low boiling components were removed, leaving 93.5 grams of crude N-xylyl-N'-isopropyl-p-phenylenediamine. This crude was subjected to distillation at 0.5 mm. pressure yielding 6.5 grams of a forecut boiling at 100–170° C. and 84.5 grams product cut boiling at 170–180° C. at 0.5 mm., leaving 3.0 grams of residue in the flask.

EVALUATION IN GASOLINE

The inhibitor of the invention was evaluated by the Universal Oil Products Company Bomb Test Method H-6-40 described in its publication entitled, "Laboratory Test Methods for Petroleum and Its Products," 3rd edition. This test measures the oxidation stability of gasoline under a standard set of conditions which are: 100 lbs. oxygen pressure, temperature 211.6±.2° F., 200 ml. fuel contained in 8-oz. oil sample bottles and using stainless steel bombs provided with a suitable time and pressure recorder attachment. The samples are purged twice with oxygen, before starting, to insure an atmosphere of pure oxygen. The oxygen pressure is then increased to 100 p.s.i. and the temperature adjusted to 211.6° F. The test is continued until a sharp drop in oxygen pressure is observed on the recorder; at this point the gasoline is oxidized and the corresponding time interval is called the induction period.

Example

The results obtained by evaluating a sample of gasoline containing N - xylyl - N' - isopropyl-p-phenylenediamine against a sample of the same gasoline containing no inhibitor, as a control, and also against a sample of the same gasoline containing a well known gasoline inhibitor, N,N'-disecondry-butyl-p-phenylenediamine, are shown in the following table:

TABLE

| Inhibitor | Concentration, wt. percent | Induction Period, minutes | Inhibitor ratio [1] |
|---|---|---|---|
| None (control) | | 85 | |
| N,N'-disecondary-butyl-p-phenylenediamine | 0.002 | 1,020 | |
| | 0.003 | 1,170 | |
| N-xylyl-N'-isopropyl-p-phenylenediamine | 0.002 | 1,580 | 1.60 |
| | 0.003 | 1,905 | 1.67 |

[1] The induction period ratio (Inhibitor Ratio, I.R.) is calculated by the following equation:

$$I.R. = \frac{[\text{Induction Period of a sample of gasoline containing N-xylyl-N'-iso-propyl-p-PDA}] \text{ minus [Induction Period of control]}}{[\text{Induction Period of sample of same gasoline containing N,N'-di-secondary-butyl-p-PDA}] \text{ minus [Induction Period of control]}}$$

It will be evident from the above table that we have by the present invention provided an effective gasoline inhibitor or stabilizer and that, when compared with a well known inhibitor (N,N'-disecondary-butyl-p-phenylenediamine) the amount of our inhibitor required to stabilize a given gasoline is considerably less than that required when using such known inhibitor.

The inhibitor of this invention is effective in retarding the formation of gum in gasolines containing unsaturated hydrocarbons, such as are produced by cracking or by the polymerization of olefines. They are also useful in retarding the deterioration of leaded gasolines, even in the case of those compositions which contain little or no unsaturates. Other uses in the stabilization of gasolines will be apparent to those skilled in the art.

Although the invention has been described in considerable detail with particular reference to certain preferred embodiments thereof, variations and modifications can be effected within the spirit and scope of the invention as described hereinabove, and as defined in the appended claims.

We claim:

1. Gasoline containing, as a stabilizer against deterioration by formation of gummy decomposition products, from .0001 to 0.01 percent by weight of N-xylyl-N'-isopropyl-p-phenylenediamine.

2. Gasoline containing, as a stabilizer against deterioration by formation of gummy decomposition products, from .001 to .005 percent by weight of N-xylyl-N'-isopropyl-p-phenylenediamine.

References Cited

UNITED STATES PATENTS

| 2,053,785 | 9/1936 | Semon | 44—74 |
| 2,348,290 | 5/1944 | Gilbert | 44—74 |
| 2,734,808 | 2/1956 | Biswell | 44—74 |
| 2,822,395 | 2/1958 | Dent | 260—576 |
| 3,000,852 | 9/1961 | Merz | 260—576 |

DANIEL E. WYMAN, *Primary Examiner.*

Y.M. HARRIS, Y. H. SMITH, *Assistant Examiners.*